NEURON SIMULATION CIRCUIT WITH WIDE FREQUENCY RANGE ASTABLE MULTIVIBRATOR
Filed Oct. 3, 1963
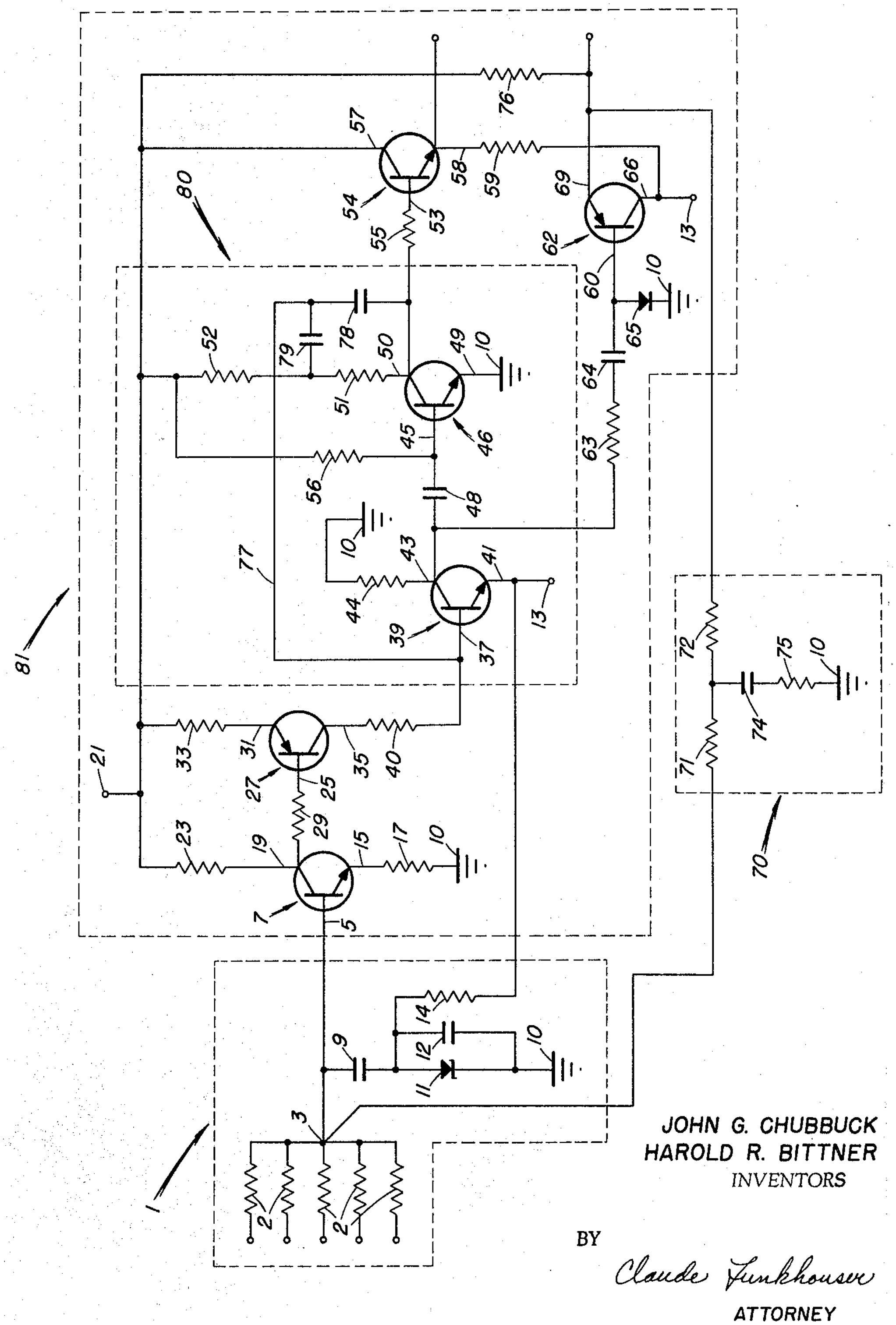
JOHN G. CHUBBUCK
HAROLD R. BITTNER
INVENTORS
BY Claude Funkhouser
ATTORNEY United States Patent Office 3,277,315

Patented Oct. 4, 1966

3,277,315

NEURON SIMULATION CIRCUIT WITH WIDE FREQUENCY RANGE ASTABLE MULTIVIBRATOR

John G. Chubbuck, Silver Spring, and Harold R. Bittner, Hyattsville, Md., assignors to the United States of America as represented by the Secretary of the Navy Filed Oct. 3, 1963, Ser. No. 313,711
5 Claims. (Cl. 307—88.5)

This invention relates in general to electronic analog simulators and, more particularly, to an electronic neuronal simulation circuit employing a pulsing operational amplifier as its active element.

Achieving an accurate analog model of a neuron permits a closer study of an individual nerve cell or of nervous systems consisting of several interconnected nerve cells. The various methods of information transfer between groups of cells form a very important area of investigation, and include information reception, transfer, reduction and utilization by these nervous systems. A nerve cell performs its above-mentioned functions in a way which is yet to be copied by man. However, by constructing an analog model of a nerve cell, it is possible to investigate its various forms of information handling by connecting two or more cells together.

One object of the present invention, therefore, resides in providing an analog circuit which simulates neuronal characteristics.

Another object of the invention is to provide an analog model of a neuron employing a high gain multivibrator.

A further object of the invention is to provide a closed loop analog model of a neuron.

Other objects and many of the attendant advantages of this invention will be readily appreciated as the same becomes better understood by reference to the following detailed description when considered in connection with the accompanying figure, which is a schematic diagram of the invention.

Briefly, the instant invention employs a pulsing operational amplifier as a means of generating neuronal type action potential signals. An input network for the pulsing operational amplifier operates to adapt input signals to a form wherein they achieve neuronal properties. Finally, a feedback network is placed in parallel with the operational amplifier to complete the required signal transformation, wherein the output signals exhibit approximate neuron type action potential characteristics.

Referring to the figure, there can be seen an input network 1 which includes a plurality of input resistors 2 for implementing a requirement of low level signal mixing. Each resistor 2 is connected to a common junction 3, and the junction is connected to a base lead 5 of a transistor 7 and to one side of a capacitor 9. The other side of the capacitor 9 is connected to ground 10 by the parallel connection of a Zener diode 11 and a capacitor 12, and is additionally connected to a potential source terminal 13 bya resistor 14.

The emitter lead 15 of the transistor 7 is connected to ground 10 by a resistor 17, and the collector lead 19 of the transistor 7 is connected to a positive potential terminal 21 by a resistor 23, and is connected to the base lead 25 of a transistor 27 by a resistor 29. The source of positive potential 21 may conveniently be at a level of 24 volts. The emitter lead 31 of the transistor 27 is connected to the source of positive potential 21 by a resistor 33. The collector lead 35 of the transistor 27 is connected to the base lead 37 of a transistor 39 by a resistor 40. The emitter lead 41 of the transistor 39 is directly connected to the source of negative potential 13, which source may be a minus twenty-four volts.

The collector lead 43 of the transistor 39 is connected to ground 10 through a resistor 44, and to the base lead 45 of a transistor 46 by a capacitor 48. The emitter lead 49 of the transistor 46 is connected to ground 10, and the collector lead 50 of said transistor is connected to the potential source 21 by series connected resistors 51 and 52. The collector lead 50 is also connected to the base lead 53 of a transistor 54 by a resistor 55, and the base lead 45 is connected to the voltage source 21 by a resistor 56.

A collector lead 57 of the transistor 54 is directly connected to the potential source 21, and the emitter lead 58 of said transistor is connected to the potential source 13 by a resistor 59.

The collector lead 43 of the transistor 39 is also connected to the base lead 60 of a transistor 62 by a series connected resistor 63 and a capacitor 64. The junction of the capacitor 64 and the base lead 60 is connected to ground through a diode 65. The diode is connected to maintain the base lead 60 negative with respect to the ground potential. The collector lead 66 of the transistor 62 is connected to the potential source 13. Transistors 39 and 46 are connected to provide multivibrator stages, and the transistors 54 and 62 are emitter follower stages which function to prevent overloading of said multivibrator stages.

The junction 3 is connected to the emitter lead 69 of the transistor 62 by a feedback network 70, which network includes a pair of resistors 71 and 72 in series between the junction 3 and the emitter lead 69. The junction of the resistors 71 and 72 is connected to ground by a series connected capacitor 74 and resistor 75. The emitter lead 69 is also connected to the potential source 21 by a resistor 76. The base lead 37 of the transistor 39 is connected to the collector lead 50 of the transistor 46 by a line 77 and a capacitor 78, and is connected to the junction of the resistors 51 and 52 by the line 77 and a capacitor 79.

The circuit shown in the figure exhibits many neuronal characteristics, and operates to imitate the action of a single neuron. The electronic circuit demonstrates the neuronal characteristic of convergence by employing network 1 as the coupling device for the applied stimuli. By using the resistors 2, the response of the electronic neuronal circuit is a function of the total stimuli regardless of the distribution of the stimuli among the various inputs. Additionally, this circuit generates output pulses at a frequency characteristic of a stimulated nerve cell. These pulses are generated in a high gain, high power output, frequency controlled multivibrator 80 which is constituted by the stages 39 and 46.

In operation, the instant invention exhibits a high ratio of input to output impedance, and therefore is capable of driving several other similar circuits when attached thereto. Ideally, a ratio of the order of 100 to 1 is desirable. However, in order to exhibit the above-mentioned high impedance ratio, and also to maintain the use of a linearly independent mixing circuit, the instant invention employs a low level mixing circuit (the network 1) followed by very high gain transistor amplifying stages, including the transistors 7 and 27.

As seen in the figure, the resistors 2 of the input network 1 are utilized to implement the requirement for low level mixing. Additionally, the ohmic value of the resistors 2 performs a weighing operation on each signal applied therethrough. More specifically, these resistors are replaceable by others of lesser or greater value, depending upon the expected operation of the entire circuit in response to the applied signals. However, the values of the resistors 2 or their substituted values depend upon neuronal circuit requirements and are easily ascertained by those skilled in the art.

The value of a resistor 2 determines the amount of current flowing therethrough, which current thereafter represents the applied action potential signal. The individual current developed through a resistor 2 is combined with other currents developed over the remaining input resistors 2 by the summing capacitor 9, which capacitor functions to accumulate both negative and positive charging currents thereon, thereby representing both an excitatory and an inhibitory action potential signal. However, an unpolarized capacitor of the size required by the circuit is physically too large, therefore, a polarized capacitor is utilized. Consequently, the summing capacitor is connected to a negative reference voltage source, thereby protecting the capacitor from damaging polarity reversals. The reference potential so established represents the quiescent position between excitatory and inhibitory input signals. The Zener diode 11 establishes this reference potential, while the resistor 14 prevents a major portion of harmful power supply ripple from flowing to the base lead 5 of the transistor 7. The capacitor 12 filters any power supply ripple which passes through the resistor 14.

The above-mentioned bipolarity operating requirements of the capacitor 9 originate from the neuronal characteristic wherein an excitatory input signal is a positive signal and an inhibitory input signal is a negative signal. The polarity of the predominant input signal determines whether the circuit will activate or not. Additionally, the sum of the input stimuli determines the rate at which the circuit reacts. The instant invention reacts with an oscillatory action by its active element, the multivibrator 80.

Although a neuron operates more vigorously in response to a higher voltage level signal, its operation is not linear. Actually, the correlation between the stimulation of a neuron cell by input stimuli and the cell's output firing frequency has been determined by Polissar et al. and is disclosed in their publication entitled "The Kinetic Basis of Molecular Biology," John Wiley and Sons, Inc., New York, N.Y., 1959. The defining equation of behavior of such a cell and the instant invention is:

$$f_o=\frac{t_n s+1}{(t_1 s+1)(t_2 S+1)}[\Sigma_i k_i f_i-\Sigma_j k_j f_j]$$

where:

- $f_o$=the output firing frequency,
- $t_1$, $t_2$, $t_n$=the Polissar time constants,
- $f_i$=pulse frequency of the $i^{th}$ excitatory input,
- $k_i$=weighing function of the $i^{th}$ input,
- $f_j$=pulse frequency of the $j^{th}$ inhibitory input, and
- $k_j$=weighing function of the $j^{th}$ input.

The input network 1 is employed to furnish the Polissar time constant $t_2$ which is set out in the above equation, while the feedback network 70 serves to average the pulse output from the emitter follower 62 and provides the remaining Polissar time constants $t_n$ and $t_1$, according to well-known operational amplifier theory.

The circuits enclosed within the dashed line 81 operate as a pulsing operational amplifier which reacts in response to the voltage level of the instantaneous summation of input signals available at the junction 3. In simulating the action of a nerve cell, the instant invention possesses dynamic characteristics which respond to the instantaneous summation of input signals. This dynamic characteristic is a 20:1 output frequency increase over an operating range of input excitatory pulses, and is attained by making the included multivibrator 80 responsive to a variable voltage source and a variable impedance source.

The operating frequency of a multivibrator is normally governed by the time constant of its inphase feedback networks. The instant invention utilizes a constant bias and impedance feedback network which includes the capacitor 48 and the resistor 56, and a variable impedance feedback network which includes capacitors 78 and 79 and the resistor 40 in series with the transistor 27, having a conductance term $l/h_{22}$ which serves as the variable impedance element. Additionally, the base lead 37 of the transistor 39 is connected to a variable voltage source which includes the transistor 27 and the resistor 40. As the transistor 27 draws various amounts of collector current, a changing voltage is developed through the resistor 40. Accordingly, a changing reference voltage level is applied to the base lead 37, thereby causing the multivibrator 80 to fire at variable rates, as will be described in more detail hereinafter.

The transistor stages 39 and 46 are included in an astable multivibrator 80 whose operating frequency (output pulse rate) is controlled by the amount of conduction occurring at transistor 27 and whose output pulse width is fixed by the values of capacitor 48 and resistor 56.

More specifically, assuming that the multivibrator 80 is in that operating condition wherein transistor stage 39 is caused to conduct, a negative going signal is applied through capacitor 48 to the base of transistor 46, thus cutting off this latter transistor. As a result, the collector of transistor 46 is at the positive supply voltage, whereas the collector of transistor 39 is essentially at the negative supply voltage. In this operating condition, biphasic output pulse levels are thus being produced by the astable multivibrator 80.

The length of time during which the multivibrator 80 will remain in this condition, with transistor 39 conducting and transistor 46 cut off to produce the pulse outputs, is controlled by the value of capacitor 48 and resistor 56. More specifically, as the signal at capacitor 48 begins to discharge, the bias on the base of transistor 46 is gradually decreased until transistor 46 is once more driven into its conducting state. Consequently, a negative going signal is now coupled from the collector of transistor 46, over wire 77, to the base of transistor 39 to turn it off. This latter operating condition represents the interpulse interval of the multivibrator 80. It should furthermore be noted that, during this interpulse interval, the output voltage levels appearing at the collectors of transistors 39 and 46 are both essentially at ground or zero potential; i.e., the biphasic pulse outputs are referenced to the same voltage level. This results from the fact that the collector of transistor 39 is grounded through resistor 44, while the emitter of transistor 46 is connected directly to ground.

The length of the interpulse period is partially controlled by the RC series circuit comprising capacitor 79, resistor 40, the impedance of transistor 27 and resistor 33, and, as previously mentioned, is also dependent upon the voltage level appearing at the base 37 of the transistor stage 39. Thus, the operating state of transistor 27 functions in two distinct ways to control the output pulse rate of the multivibrator 80, in accordance with the voltage signal supplied to its base 25 by transistor 7 which, in turn, is controlled by the summed input stimuli voltage signals applied through resistors 2.

The lowest output pulse frequency (largest interpulse period) is obtained when transistor 27 is cut off; i.e. when the total input excitatory voltage signal is insufficient to cause transistor 7 to conduct, since the base of transistor 39 is now nominally open-circuited and the emitter to base conduction of transistor 39 then makes the effective value of the base voltage for transistor 39 very low. On the other hand, as transistor 27 is brought more and more into conduction, by a steady increase in the input stimuli signal and the resulting conduction of transistor 7, the effective value of the voltage level appearing at the base of transistor 39 linearly increases towards the positive supply voltage. The above-described variation in the effective voltage appearing at the base of transistor 39 accounts for about half of the frequency or pulse rate variation obtainable from the multivibrator stage 80. This is true because the emitter to collector impedance value $l/h_{22}$ of transistor 27 is relatively constant throughout this region of linear conduction increase.

However, as the transistor 27 is driven into saturation, by further increase in the excitatory input voltage level, its impedance value rapidly decreases and thus reduces the effective time constant for that multivibrator condition wherein the transistor 39 is cut off and the transistor 46 is conducting. Accordingly, the transistor stage 39 is biased off for a shorter period of time, to thus decrease the interpulse interval and thereby increase the output pulse rate from the multivibrator 80.

By this above-mentioned technique of varying both the RC time constant and effective voltage appearing at the base of transistor 39, in an additive manner, a substantial increase has been obtained in the dynamic range of operating frequency or pulse rate variation; i.e. the ratio of the highest to the lowest frequency or pulse rate obtainable from the multivibrator 80. In practice, a dynamic range of better than 100 to 1 has been obtained, as compared to a dynamic range of about 5 to 1 obtainable by the prior art.

A neuron is, as stated, responsive to both inhibitory and excitatory signals, consequently, the instant invention generates signals corresponding to each type signal. However, these signals should not be arbitrarily selected, but rather carefully selected for compatibility with the input circuit employed in the instant invention. Therefore, the instant invention generates biphasic output action potential signals having a normally constant value at ground potential. The positive going unidirectional pulse represents an excitatory output, while the negative going unidirectional pulse represents an inhibitory output.

The instant invention accomplishes its biphasic signal generation by a unique voltage interconnection method. This method contemplates connecting the collector 43 of the transistor 39 to ground 10, and the emitter 49 of the transistor 46 to ground 10 for establishing the same normally constant level of the biphasic pulses. The emitter 41 of the transistor 39 is connected to a negative potential source 13 to establish the negative excursion limit of an inhibitory pulse, and the collector 50 of the transistor 46 is connected to the potential source 21 to establish the positive excursion limit of an excitatory pulse. Since there is no D.-C. path connecting the two transistors 39 and 46, they will operate when connected to different potential sources.

As pointed out in the foregoing discussion, when the transistor stage 46 is conducting, the collector of this transistor stage is effectively at ground potential; while, when the stage 46 is cut off the collector voltage is effectively the positive supply represented at 21. On the other hand, when the transistor stage 39 is conducting (stage 46 cut off), the collector voltage of transistor 39 is effectively the negative supply voltage established at 13; whereas, when transistor stage 39 is cut off (stage 46 conducting), the collector voltage at transistor 39 is effectively at ground potential.

The advantage of the biphasic type output signals lie in their application as an input action stimuli when they may be summed in a low level mixing circuit such as the network 1 shown in the figure. Thus, by referencing the biphasic pulses from the multivibrator 80 to the same ground potential, these biphasic output pulses may be more readily summed, as the excitatory and inhibitory input signals, in a passive network at the input to other similar neuron simulation circuits. This is not possible with the type of pulses produced by the prior art simulating circuits where the pulses produced thereby are not referenced to the same voltage level.

Component values which have been selected for use in a preferred embodiment of the instant invention are as follows:

| | | |
|---|---|---|
| R2, R59, R71, R72 and R76 | kohms | 51 |
| R17 and R33 | ohms | 680 |
| R23 | kohms | 10 |
| R29, R55 and R63 | kohms | 2.4 |
| R40 | kohms | 33 |
| R44 | kohms | 3 |
| R51 | kohms | 2 |
| R52 | kohms | 1 |
| R68 | kohms | 24 |
| R75 | kohms | 8.2 |
| C9 | $\mu$f. | 10 |
| C13 | $\mu$f. | 60 |
| C48 | $\mu$f. | 0.01 |
| C64 | $\mu$f. | 0.22 |
| C74 | $\mu$f. | 4.7 |
| C78 | $\mu$f. | 0.0033 |
| C79 | $\mu$f. | 0.1 |
| CR11 | | 1N761 |
| CR65 | | 1N192 |
| Q7, Q39, Q46 and Q54 | | 2N388 |
| Q27 | | 2N328A |
| Q62 | | 2N527 |

Obviously, many modifications and variations of the present invention are possible in the light of the above teachings. It is therefore to be understood that within the scope of the appended claims the invention may be practiced otherwise than as specifically described.

What is claimed is:

1. Circuitry for simulating the response of a physical neuron to input stimuli comprising, a multivibrator having first and second stages and being operable to a first condition wherein said first stage is conducting and said second stage is cut off and to a second condition wherein said section stage is conducting and said first stage is cut off, input circuit means for producing a signal level dependent upon the level of said input stimuli operably connected to supply said signal level to said multivibrator for causing said multivibrator to alternate between said first and second operating conditions, said first and second multivibrator stages being adapted to produce biphasic output pulses when said multivibrator is in a selected one of said first and second operating conditions, a pair of output circuit means connected respectively to said first and second stages of said multivibrator to receive said output biphasic pulses therefrom, and control circuit means connected to each of said first and second stages of said multivibrator for establishing a common reference voltage level in each of said output circuit means during the other of said operating conditions for said multivibrator.

2. The circuitry specified in claim 1 wherein, said multivibrator includes a source of opposite polarity supply voltages and first and second transistor stages each having an emitter, a collector and a base connection, the base connection of each transistor stage being capacitively coupled to the collector of the other transistor stage, the collector of said first transistor stage being resistively connected to a supply voltage of one polarity and the emitter of said second transistor stage being directly connected to a supply voltage of opposite polarity, said output circuit means includes a first circuit connected to receive pulses of one polarity from the collector of said first transistor stage and a second circuit connected to receive pulses of the opposite polarity from the collector of said second transistor stage, and said control circuit means includes a third circuit connecting the emitter of said first transistor stage directly to ground and a fourth circuit connecting the collector of said second transistor stage to ground through a resistor element.

3. The circuitry specified in claim 1 further including averaging feedback circuit means connecting a selected one of said first and second circuits of said output circuit means to said input circuit means.

4. The circuitry specified in claim 2 wherein, the base connection of one of said transistor stages is furthermore connected to said supply voltage source through a constant value resistance element, and the base connection of the other of said transistor stages is furthermore connected to said supply voltage source through a variable value resistance element.

5. The circuitry specified in claim 4 further including means for varying the value of said variable value resistance element dependent upon the signal level produced by said input circuit means.

References Cited by the Examiner

UNITED STATES PATENTS

| | | | |
|---|---|---|---|
| 2,598,516 | 5/1926 | Dickinson | 332—14 |
| 2,846,583 | 8/1958 | Goldfischer et al. | 331—144 |
| 3,010,078 | 11/1961 | Stefanov | 331—113 X |
| 3,129,391 | 4/1964 | Kabell. | |
| 3,218,475 | 11/1965 | Hiltz | 307—88.5 |

OTHER REFERENCES

Electronic Design, "Electronic Neurons," September 14, 1960, p. 40.

ARTHUR GAUSS, *Primary Examiner.*

M. W. LEE, S. D. MILLER, *Assistant Examiners.*